US006160728A

United States Patent [19]

Peterson et al.

[11] Patent Number: 6,160,728

[45] Date of Patent: Dec. 12, 2000

[54] DUAL-MODE AC/DC ELECTRICAL RECEPTACLE

[75] Inventors: Joe W. Peterson, Austin; Al Hartmann, Round Rock, both of Tex.

[73] Assignee: Advanced Micro Devices, Inc., Sunnyvale, Calif.

[21] Appl. No.: 09/320,523

[22] Filed: May 26, 1999

[51] Int. Cl.[7] .................... H02M 1/00

[52] U.S. Cl. .................... 363/146; 363/147; 363/141

[58] Field of Search .................... 363/146, 141, 363/142, 143, 147; 323/247, 249, 254; 307/28, 29, 38

[56] References Cited

U.S. PATENT DOCUMENTS 5,563,782 10/1996 Chen et al. .................... 363/146

*Primary Examiner*—Peter S. Wong
*Assistant Examiner*—Rajnikant B. Patel
*Attorney, Agent, or Firm*—Conley, Rose & Tayon, PC

[57] ABSTRACT

An electrical receptacle that provides dual-mode electric power through two separate sockets. The electrical receptacle includes a first socket configured to supply AC electric current at a high voltage (such as 120V or 240V AC) and a second socket configured to supply DC current at a low voltage current (such as 4V, 6V, or 12V DC). In one embodiment, the receptacle receives the high-voltage AC from electrical wiring in a building and generates the low-voltage DC. This embodiment of the receptacle has input terminals for receiving AC, mounting hardware, an AC-to-DC converter, and one or more DC output sockets. The receptacle may also have a standard AC output socket. The receptacle may be used to provide direct current at several different voltage levels. The different voltages may be accessed simultaneously through several different DC sockets. Alternatively or in combination, one or more switches may be used to select the voltage level delivered by individual sockets or groups of sockets. In another embodiment, the electrical receptacle receives the DC from an external source, such as 12 V DC supply lines installed in a building. In this embodiment, the electrical receptacle includes input terminals for the high-voltage AC, input terminals for the low-voltage DC, mounting hardware, at least one output socket for the AC, and at least one output socket for the DC. Additional switched or unstitched sockets may also be used. Also described is an electrical adapter that plugs into a standard electrical socket and generates low-voltage direct current.

10 Claims, 3 Drawing Sheets

DUAL-MODE AC/DC ELECTRICAL RECEPTACLE

BACKGROUND OF THE INVENTION

1. Field of the Invention

The invention relates to electronic power supplies and power converters.

2. Description of the Related Art

Wiring in homes and other buildings has evolved over time to conform to fairly uniform standards. When a consumer in North America purchases an electrically-powered product, he generally does so without concern over its ability to use the electricity supplied by wiring in his house or office. The motors and bulbs in kitchen appliances, office equipment, lamps, power tools, and other electric devices are generally designed to be powered by a 120V AC supply (i.e.: a supply that delivers alternating current at 60 Hz with a potential of 120 volts RMS). The plugs for these devices and the sockets for the wiring outlets are also standardized. The standardization of these physical features ensures compatibility between the electric power supplies and the devices that use them. Other standards, such as the 220V AC system, similarly facilitate the design and use of electrical appliances in other regions of the world.

Many electronic devices, however, require a lower-voltage power source, and direct current instead of AC. To use the available electric power, such as 120V AC, these devices generally use a converter that transforms the available electric power to a lower voltage, rectifies it, and filters it to generate a constant-voltage (DC) supply. The output of the converter is DC at a low voltage, generally between 4 and 30 volts.

The converter may be incorporated into the device as an internal power supply that receives 120V AC through an electric cord that plugs into a wall socket. Alternatively, the converter may be an external unit, configured as a large wall plug for the device. An external converter generally plugs into a wall socket and supplies low-voltage DC electricity through a power cord. On the other end, the power cord either connects directly to the electronic device or has a plug configured for a socket in the electronic device.

A device that uses an external converter has the advantage of being somewhat lighter and more compact, since the additional circuitry and components do not have to be incorporated in the device. Thus, the external converters are commonly used with smaller household items such as answering machines, telephones, arid calculators, among others.

However, the external converters often become separated from their associated devices when equipment is moved from one room to another or from one building to another, or when equipment is placed in temporary storage. Further, both internal and external converters add a degree of complexity and expense to the electronic device. And in the case of custom-made electronic devices assembled by an electronics hobbyist, the hobbyist must either purchase or build a power supply to test and operate her custom device. It would therefore be convenient and economically beneficial to reduce the reliance on dedicated AC/DC converters for individual electronic devices.

SUMMARY OF THE INVENTION

Described herein is an electrical receptacle that receives high-voltage alternating current (such as 120V or 240V AC) from electrical wiring in a building and provides low-voltage direct current (such as 4V, 6V, or 12V DC). The receptacle has input terminals configured for connecting to the building's wiring and mounting hardware for installing the receptacle on an electrical receptacle box. The receptacle includes an AC-to-DC converter that generates the low-voltage direct current from the high-voltage alternating current. One or more DC sockets affixed to the mounting hardware can be used to provide the low-voltage DC to the power plug of an electronic device. The receptacle may also have a standard AC socket that provides the high-voltage AC. In one embodiment, the socket can be used to provide direct current at several different voltage levels. The different voltage levels may be accessed simultaneously, through several different DC sockets. Alternatively or in combination, one or more switches may be used to select the voltage level delivered by individual sockets or groups of sockets.

In one embodiment, the electrical receptacle receives the direct current from an external source. For example, the building's wiring may include supply lines for 12 V DC. In this embodiment, the electrical receptacle includes two sets of input terminals: one for receiving the high-voltage AC, and a second for receiving the low-voltage DC. Mounting hardware in the receptacle allows it to be affixed to an electrical receptacle box, and the electricity is provided through two sockets: one for the alternating current and one for the direct current. Additional sockets may be used to provide the DC electricity at a single voltage level or at several different voltage levels. The DC socket(s) may also be switched to select among two or more voltage levels.

Also described is an electrical adapter that plugs into a standard electrical socket and generates low-voltage direct current. The adapter has a plug configured for the standard electrical socket, an AC-to-DC converter, and a DC socket configured to provide the low-voltage direct current to a DC power plug.

Still further, it is envisioned that an electrical receptacle may provide dual-mode electric power through two separate sockets. In this embodiment, the electrical receptacle includes a first socket configured to supply AC electric current at a high voltage (in the range of 105 V to 260 V) and a second socket configured to supply DC current at a low voltage (in the range of 2.5 V to 30 V).

BRIEF DESCRIPTION OF THE DRAWINGS

Other objects and advantages of the invention will become apparent upon reading the following detailed description and upon reference to the accompanying drawings in which.

Figure 1:
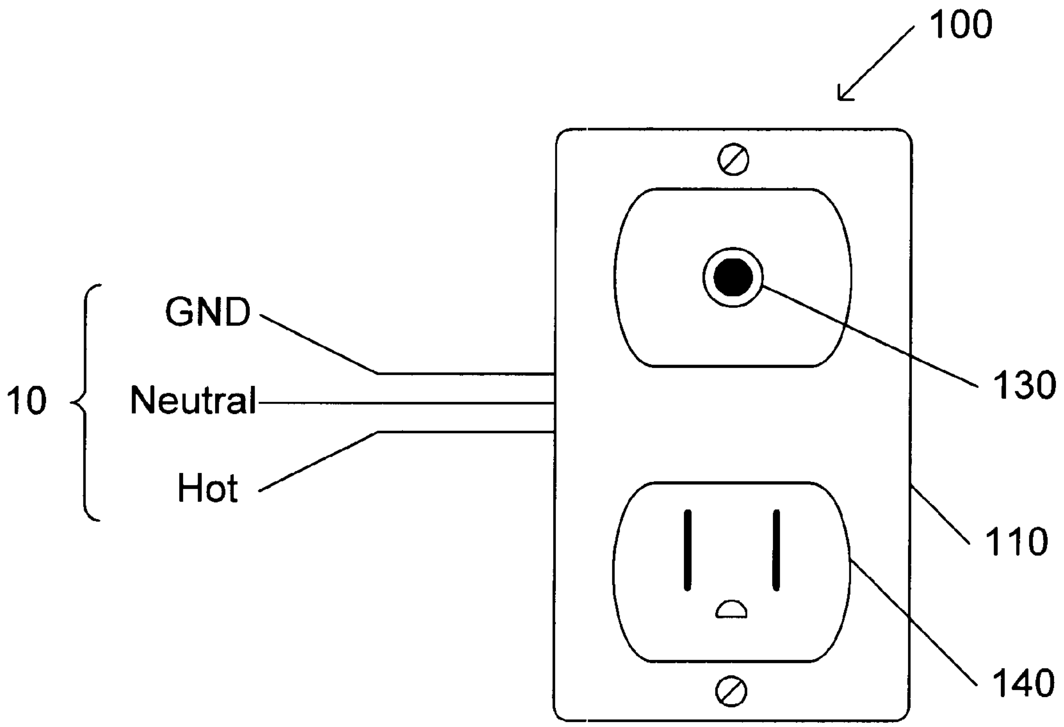
FIG. 1 shows a dual-mode electrical receptacle configured to provide low-voltage direct current as well as high-voltage alternating current.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

FIG. 1 shows an electrical receptacle 100 configured to supply both high-voltage AC electricity and low-voltage DC electricity in a building wired with supply lines for high-voltage AC electricity, such as 120V AC or 240V AC. The electrical supply unit includes mounting hardware 110. Mounting hardware 110 is preferably a wall plate configured to mount over an electrical receptacle box. In other embodiments, mounting hardware 110 may be an adapter that mounts behind a regular electrical cover plate or a receptacle block that mounts onto a building's framing or sheet-rock. Also included in the electrical supply unit are a DC electrical socket 130 and an AC electrical socket 140. These sockets 130 and 140 are supplied with power by electrical supply wires 10. Electrical supply wires 10 come from the building's electrical wiring, such as would be found in a residential, commercial, or industrial building. In one embodiment, supply wires 10 include (i) a ground wire coupled to electrical ground and usable for providing shielding around an electrical device, (ii) a neutral wire used as a current return with a potential kept roughly equal to that of the ground wire, and (iii) a hot wire that supplies electric current at a voltage of 120 volts AC with respect to the neutral wire. AC socket 140 receives electrical power from electrical supply wires 10 and provides the 120 volt AC current to a plug that may be inserted into the AC electrical socket 140. The electricity supplied by electrical supply wires 10 is also transformed to a lower DC voltage, which is made available through DC socket 130.

Figure 2:
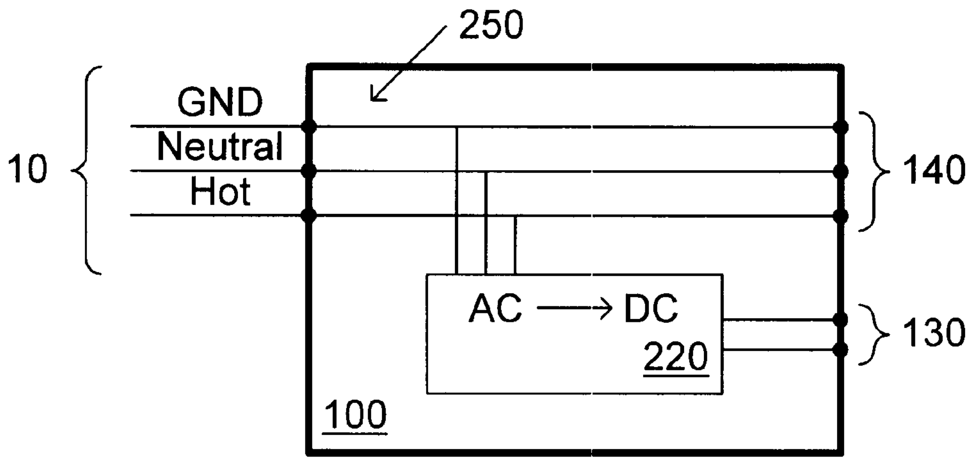
FIG. 2 is a block diagram of the electrical receptacle from FIG. 1.

FIG. 2 shows a block diagram of electrical receptacle 100. For clarity, reference numerals are repeated in this and following figures for elements that have been previously discussed. Electrical receptacle 100 receives electricity from the electrical supply wires 10 through a set of input terminals 250 mounted on electrical receptacle 100. Electrical receptacle 100 is wired so that input terminals 250 are connected directly to AC socket 140. An AC/DC converter 220 receives electrical power from input terminals 250 and generates DC electricity at a predetermined voltage. The DC electricity generated by AC/DC converter 220 is preferably a voltage level commonly used by small electronic devices, such as 4V, 6V, 12V, 15V, 18V, 24V, 28V, or 30V. AC/DC converter 220 is coupled to DC socket 130 and provides the DC electricity to DC socket 130.

The DC electricity generated by AC/DC converter 220 is generally at a lower voltage than the AC electricity received through input terminals 250. In another embodiment, AC/DC converter includes summation circuitry that allows the generated DC electricity to be a voltage substantially equal to or greater than the voltage received at input terminals 250. DC socket 130 may be a single socket, as shown in FIG. 1, or it may be a plurality of sockets that supply the same DC voltage. In another embodiment, DC socket 130 includes a plurality of sockets that provide DC voltage at more than one voltage level. For example, DC socket 130 may include six receptacles, two of which provide 6V DC, three of which provide 12V DC, and one of which provides 18V DC. In this embodiment, AC/DC converter 220 is configured to generate DC electricity at several different voltage levels. In yet another embodiment, DC socket 130 also includes one or more switches that allow one or more corresponding sockets to be switched between different voltage levels.

Figure 3:
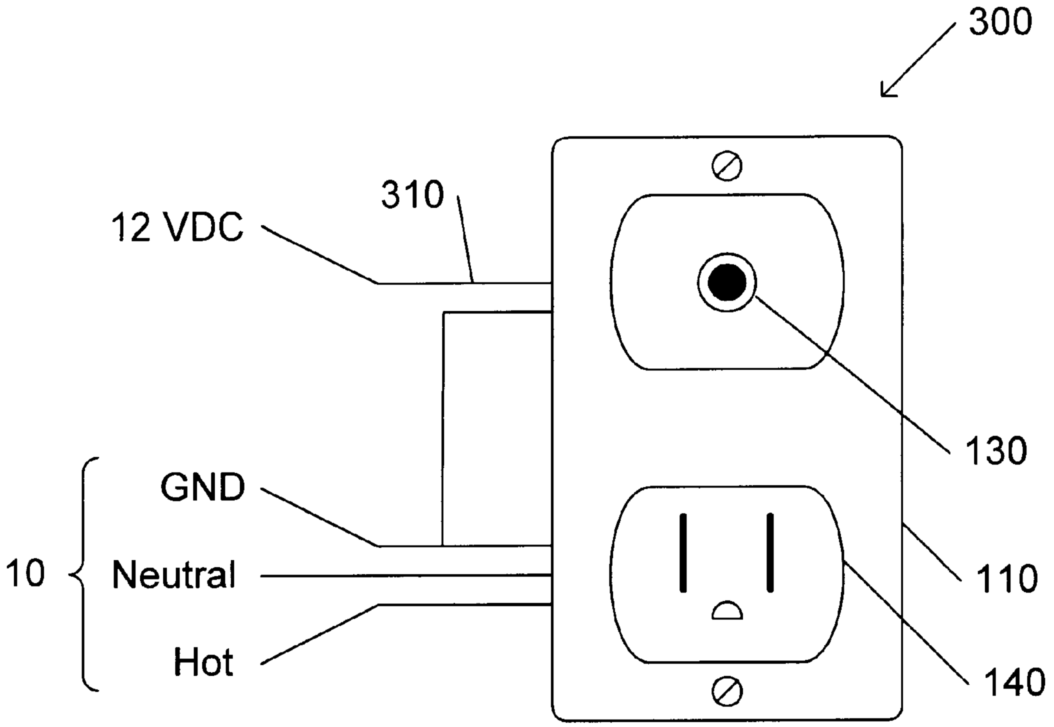
FIG. 3 shows a dual-mode electrical receptacle that receives both AC and DC electricity from a building's electrical wiring.

In another embodiment, the house wiring provides the DC electricity. As shown in FIG. 3, in this embodiment electrical receptacle 300 is configured to receive DC electricity from a 12 volt DC supply line 310. The DC supply line 310 may be wired into a building along with the 120V AC supply lines 10. The building may be a house, an office site, or a manufacturing facility, among others. It is envisioned that one or a few AC-DC converters are used to energize the DC supply line 310 throughout the building.

Figure 4:
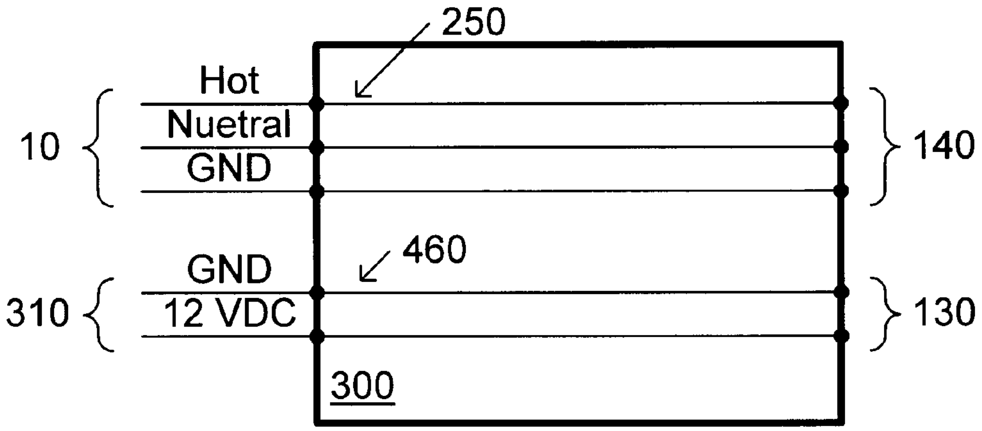
FIG. 4 is a block diagram of the electrical receptacle from FIG. 3.

FIG. 4 shows the pass-thru connections of electrical receptacle 300. A set of DC input terminals 460 mounted on receptacle 300 receive the 12V DC electricity from supply line 310. The high-voltage electricity is patched directly through electrical receptacle 300 from high-voltage input terminals 250 to AC socket 140. Similarly, the 12V DC electricity is patched directly from DC input terminals 460 to DC socket 130. In other embodiments, the DC supply line 310 supplies direct current at one or more other voltages. DC socket 130 is then configured with one or more corresponding sockets, as described above. Additionally, DC socket 130 may include one or more switches for selecting among several output voltages available through one or more sockets.

Figure 5:
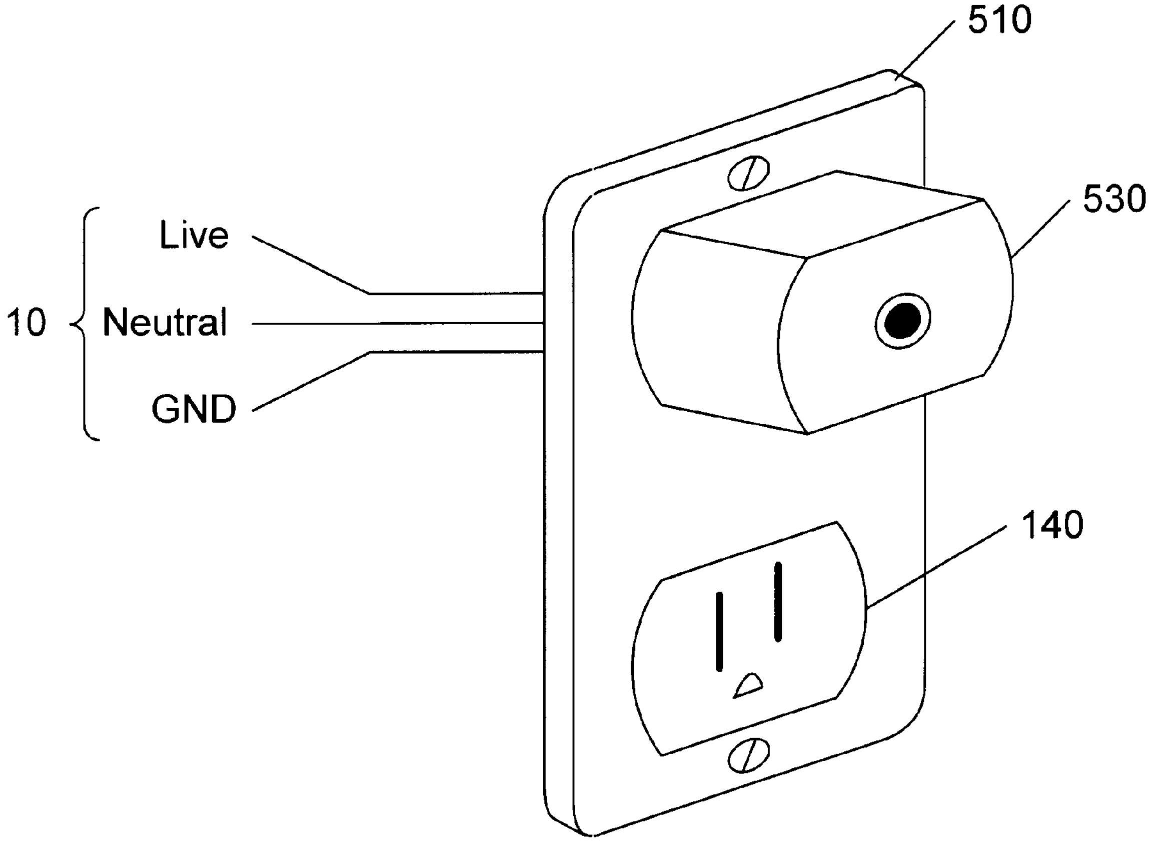
FIG. 5 shows a power plug with a built-in AC/DC converter.

FIG. 5 presents a view of an electrical adapter 530 that provides DC electricity from a standard high-voltage electrical outlet 510. Electrical adapter 530 includes plug pins configured to insert into electrical outlet 510 and to draw high-voltage electricity from the outlet 510. An AC/DC converter in electrical adapter 530 generates a constant voltage and supplies the DC voltage to an output port. In other embodiments, electrical adapter 530 includes more than one output port, and may also have more than one AC/DC converters for several different voltage levels of DC electricity. Additionally, DC socket 130 may include one or more switches for selecting among several output voltages available through one or more sockets on electrical adapter 530

While the present invention has been described with reference to particular embodiments, it will be understood that the embodiments are illustrated and that the invention scope is not so limited. Any variations, modifications, additions and improvements to the embodiments described are possible. These variations, modifications, additions and improvements may fall within the scope of the invention as detailed within the following claims.

What is claimed is:

1. An electrical adapter comprising:

a body having a first surface and a second surface;

a pair of electrically conductive blades extending outwardly from the first surface and adapted for inserting into corresponding slots of an alternating current (AC) electrical receptacle;

a direct current (DC) electrical socket positioned within the body and having an output port accessible from the second surface;

an AC-to-DC converter positioned within the body and coupled between the pair of conductive blades and the DC electrical socket, wherein when the pair of electrically conductive blades are inserted into corresponding slots of an AC electrical receptacle and the AC-to-DC converter receives an AC electrical voltage from the AC socket via the pair of conductive blades, the AC-to- DC converter is configured to produce at least one DC electrical voltage and to provide the at least one DC electrical voltage to the DC electrical socket;

wherein the body is dimensioned such that when the pair of electrically conductive blades are inserted into one of two AC electrical receptacles of a duplex AC electrical receptacle, the other AC electrical receptacle of the duplex AC receptacle is accessible; and wherein the electrical adapter is portable and may be moved from one AC electrical receptacle to another AC electrical receptacle.

2. The electrical adapter of claim 1, wherein said AC-to-DC converter is configurable to generate a selected one of a plurality of DC electrical voltages.

3. The electrical adapter of claim 2, further comprising:

a switch coupled to said AC-to-DC converter, wherein said AC-to-DC converter generates the selected one of the plurality of DC electrical voltages dependent upon a position of the switch.

4. The electrical adapter of claim 2, wherein said AC-to-DC converter is configured to generate a plurality of DC electrical voltages, and wherein the electrical adapter further comprises:

a switch coupled to said AC-to-DC converter and to said DC electrical socket, wherein said switch receives the plurality of DC electrical voltages and provides a selected one of the plurality of DC electrical voltages to the DC electrical socket dependent upon a position of the switch.

5. The electrical adapter of claim 1, wherein said AC-to-DC converter is configured to receive AC electrical voltage in the range of 105 V to 130 V.

6. The electrical adapter of claim 1, wherein said AC-to-DC converter is configured to receive AC electrical voltage in the range of 220 V to 260 V.

7. The electrical adapter of claim 1, wherein said AC-to-DC converter is configured to produce the at least one DC electrical voltage in the range of 5 V to 30 V.

8. The electrical adapter of claim 1, wherein the first and second surfaces are substantially planar.

9. The electrical adapter of claim 1, wherein the first and second surfaces are on opposite sides of the body.

10. The electrical adapter of claim 1, wherein the body has six surfaces, and wherein the first and second surfaces are two of the six surfaces of the body.

* * * * *